United States Patent [19]

Scheider

[11] Patent Number: 4,853,512

[45] Date of Patent: Aug. 1, 1989

[54] SPARK EROSION MACHINING APPARATUS

[75] Inventor: Rudolf Scheider, Reinach, Switzerland

[73] Assignee: Erowa AG, Reinach, Switzerland

[21] Appl. No.: 214,314

[22] Filed: Jul. 1, 1988

[30] Foreign Application Priority Data

Jul. 3, 1987 [DE] Fed. Rep. of Germany ....... 3722032

[51] Int. Cl.$^4$ .......................... B23H 7/00; B23H 7/22
[52] U.S. Cl. ......................... 219/69.15; 204/224 M; 219/69.01
[58] Field of Search ................ 219/69 E, 69 R, 69 D, 219/69 V; 204/224 M, 297 R

[56] References Cited

U.S. PATENT DOCUMENTS

| | | | | |
|---|---|---|---|---|
| 4,316,071 | 2/1982 | Bonga | ................................ | 219/69 R |
| 4,563,800 | 1/1986 | Bonga | ................................ | 219/69 R |
| 4,764,653 | 8/1988 | Bühler | ................................ | 219/69 R |

FOREIGN PATENT DOCUMENTS

| | | |
|---|---|---|
| 0132599 | 6/1984 | European Pat. Off. . |
| 2837719 | 8/1978 | Fed. Rep. of Germany . |
| 3303758 | 8/1984 | Fed. Rep. of Germany ... 219/69 D |
| 3533001 | 9/1985 | Fed. Rep. of Germany . |
| 139835 | 10/1981 | Japan ............................... 219/69 E |
| 168836 | 10/1982 | Japan ............................... 219/69 E |

Primary Examiner—A. D. Pellinen
Assistant Examiner—Geoffrey S. Evans
Attorney, Agent, or Firm—Tarolli, Sundheim & Covell

[57] ABSTRACT

A spark erosion machining apparatus with an electrode changing mechanism having electrode support members and a frame that are connected to the interior front wall of the tub that can be opened like a door Two pairs of levers are pivotally mounted on the frame. The free ends of the levers have a transverse beam with perpendicularly protruding electrode support members. The transverse beams with the electrode support members can be pivoted (using hydraulic or pneumatic cylinder pistons) from a rest position where they are near to the front wall of the tub into an operating position where the electric support members are in an essentially central portion of the tub.

12 Claims, 4 Drawing Sheets

SPARK EROSION MACHINING APPARATUS

BACKGROUND OF THE INVENTION

1. Field of the Invention

The present invention refers to a spark erosion machining apparatus comprising a spindle adapted to receive and clamp an electrode used for machining a workpiece into a desired shape, a displaceably mounted working table located in a certain distance below the spindle, first drive means operatively coupled to the working table to displace it with regard to the spindle within a horizontal plane in X-direction, second drive means operatively coupled to the working table to displace it with regard to the spindle within a horizontal plane in Y-direction and a tub mounted on the working table adapted to receive the dielectric liquid required for the erosion machining and to receive the workpiece to be machined.

Such spark erosion machining apparatus are more and more used in the metal machining industry; their mode of operation should be well known to any person skilled in the art and must not be explained here since it is of no further importance for the present invention. However, it must be noted in connection with the present invention that electrodes of such a spark erosion machining apparatus have to be changed frequently during the machining operation of a workpiece.

Many spark erosion machining operations of a single workpiece require that the electrode used to machine the workpiece has to be changed several times in the course of the machining operation, particularly if the control of the machining apparatus is performed more or less automatically; such a machining apparatus is in a position to perform a plurality of machining operations on a single workpiece in sequence.

2. Prior Art

In order not to disturb or interrupt this automatically running machining operation, automatically operating electrode change means have been developed which can be controlled by the same control means used for controlling the automatic operation of the machining apparatus. A typical, general example of a tool changer is disclosed, e.g. in German Laid Open Patent Application No. 28 37 719.

These problems are particularly present in connection with the electro-erosive machining of workpieces because such machining is a relatively slowly progressing machining operation. Thus, it is most desirable to automate this kind of machining operation as fully as possible.

In the prior art are known, for instance from the disclosure of German Laid Open Patent Application No. 35 33 001, electro-erosive machining apparatus incorporating an electrode change device which includes an electrode magazine in the form of an endless continuously running chain-like storage member. Further, a gripping arm is provided and operated to grasp a selected electrode and to insert it into the electro-erosive machining apparatus, and to remove the electrode from the electro-erosive machining apparatus and to put it back into the storage member, respectively. In order to ensure that the selected electrode is taken out of the magazine and that the electrode removed from the machining apparatus is put back to its proper position in the magazine, respectively, a magazine of the kind referred to above must be driven to run along a continuous path until the selected electrode or the proper storage position comes to a location where it can be reached by means of the above mentioned gripping arm.

The main disadvantages of this kind of electrode change apparatus are, on the one hand, the large space requirement and, on the other hand, the comparatively slow access speed, particularly if a large number of electrodes are in the magazine which must be ready for immediate access.

In order to avoid these disadvantages, it has been proposed, e.g. in the European Patent Application No. 0 132 599, to use a tool magazine comprising a plurality of essentially disc-shaped tool support members which are rotatable around a first axis of rotation, the tools being arranged along the periphery of the tool support members. Further, there is provided a transport arm which is pivotal around a second axis of rotation and located in a certain distance from the first axis of rotation, said transport arm being adapted to grasp the tools, to remove them from the magazine and to insert them into the machining apparatus and vice versa. Such a tool magazine requires less space and has an improved access speed.

However, there is the disadvantage that such a tool magazine is very expensive and, thus, can be reliably used only if it is necessary to have access to a comparatively great number of electrodes stored in the magazine.

In may cases, however, it is not necessary to have dozens or even hundreds of electrodes ready for immediate access, but it would be sufficient to have the possibility to change only a few electrodes automatically. Consequently, the purchasing of an automatic electrode change apparatus of the kind mentioned hereinbefore would be uneconomic.

OBJECTS OF THE INVENTION

It is, therefore, an object of the invention to provide a spark erosion machining apparatus of the kind mentioned hereinbefore incorporating a change mechanism for only a few electrodes.

It is a further object of the invention to provide a spark erosion machining apparatus incorporating an electrode change mechanism which requires hardly more space than an equivalent known apparatus without an electrode change mechanism.

It is a still further object of the invention to provide a spark erosion machining apparatus incorporating an electrode change mechanism which is of simple and sturdy construction and, thus, does not require a great investment since it can be manufactured and sold to an inexpensive price.

SUMMARY OF THE INVENTION

In order to meet these and other objects, the invention provides a spark erosion machining apparatus which has a spindle adapted to receive the clamp an electrode used for machining a workpiece into a desired shape, a displaceably mounted working table located in a certain distance below the spindle, first drive means operatively coupled to the working table to displace it with regard to the spindle within a horizontal plane in X-direction, second drive means operatively coupled to the working table to displace it with regard to the spindle within a horizontal plane in Y-direction, and a tub mounted on said working table adapted to receive the dielectric liquid required for the erosion machining and to receive the workpiece to be machined.

To keep the electrodes ready for changing, at least one electrode storage means is provided having a plurality of electrode support members and is located in the interior of said tub. This electrode storage means comprises linkage means pivotally connecting the electrode support members to at least one side wall of the tub of the machining apparatus.

In order not to impair the available working area within the tub, the electrode support members are pivotal from a retracted rest position near said side wall of the tub into an operating position in which they protrude from said side wall of the tub towards the interior of the tub into an operating region.

The first and second drive means are adapted to displace the tub in X- and/or Y-direction such that the spindle of the apparatus is above a selected electrode received in the electrode support members when the electrode support members are pivoted into their operating position.

Consequently, if the size of the tub is increased by only a small amount, for instance, six, eight or ten electrodes, depending of the size thereof, can be kept ready within the tub, near to one side wall. Thanks to the fact that the electrode support members are pivotal into an essentially central position within the tub, it is ensured that the spindle of the spark erosion machining apparatus can pick up a selected electrode out of the electrode support members without the need to adapt the drive means for the X- and Y-displacement of the tub.

In order to assist the change operation, particularly to reduce the time required for either placing an electrode back from the spindle to the storage member or to pick an electrode out of a storage member, the storage means can be mounted to be displaceable in Z-direction. Advantageously, hydraulic or pneumatic piston-cylinder means are provided to perform the above mentioned Z-direction displacement.

In a preferred embodiment, the electrode storage means comprises a frame including a frame part mounted to one of the side walls of the tub. The frame part is displaceable in height (Z-) direction, for instance by pneumatic or hydraulic piston-cylinder assemblies. Further, two pairs of levers are pivotally mounted on the frame part and two groups of electrode support members are connected to the free ends of each pair of the levers. The two groups of electrode support members are symmetrically arranged with regard to a central axis of the one side wall of the tub.

Preferably, the levers are pivotally mounted on the frame and on the electrode support members such that each of the electrode support member group can be swivelled into an essentially central position within the tub. This can be realized easily if the levers are of angled shape.

Again in accordance with the aforementioned preferred embodiment, the tub comprises a hinged door-like front wall on which the electrode storage means is mounted. This measure allows unhindered access to the electrodes received in the storage members if the machining apparatus is not in operation, e.g. for cleaning, replacing etc.

BRIEF DESCRIPTION OF THE DRAWINGS

In the following, an embodiment of the invention is further described, with reference to the accompanying drawings, in which.

DESCRIPTION OF A PREFERRED EMBODIMENT

Figure 1:
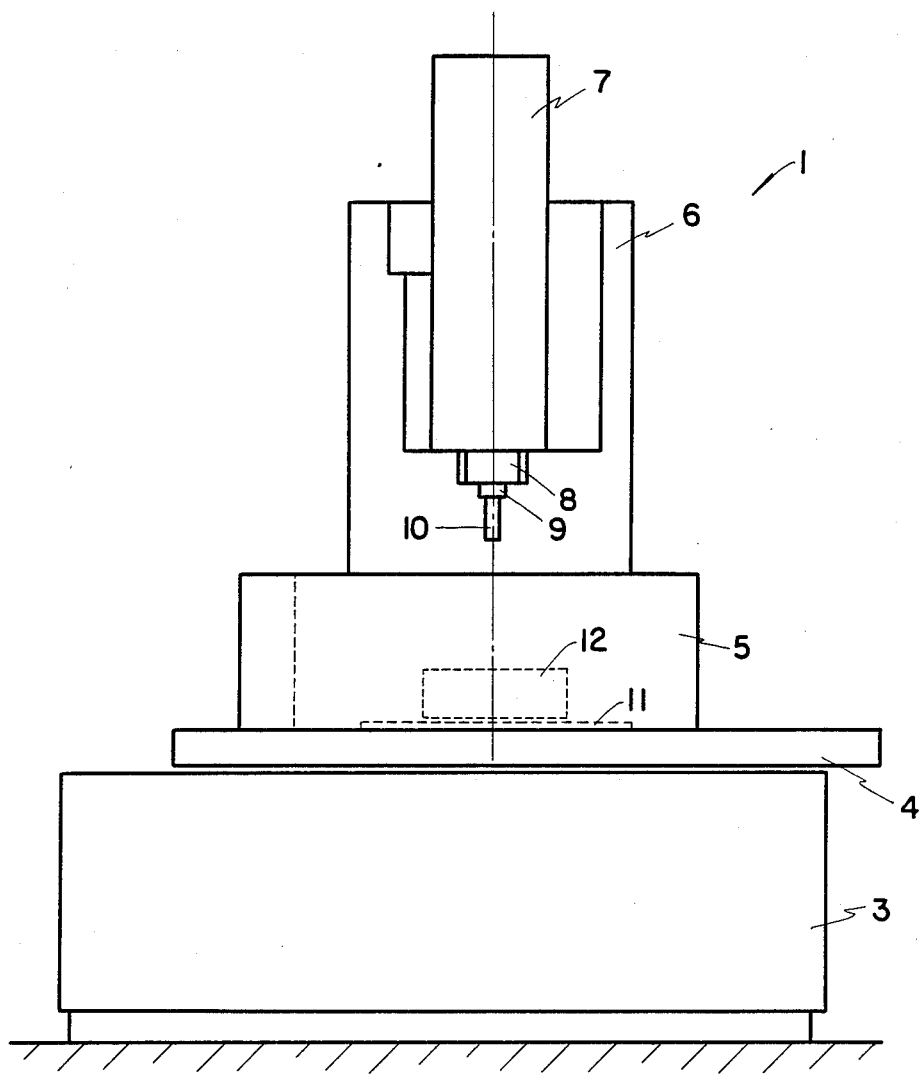
FIG. 1 shows a schematic front view of an electro-erosive machining apparatus known per se and incorporating an electrode change mechanism according to the invention.
Figure 2:
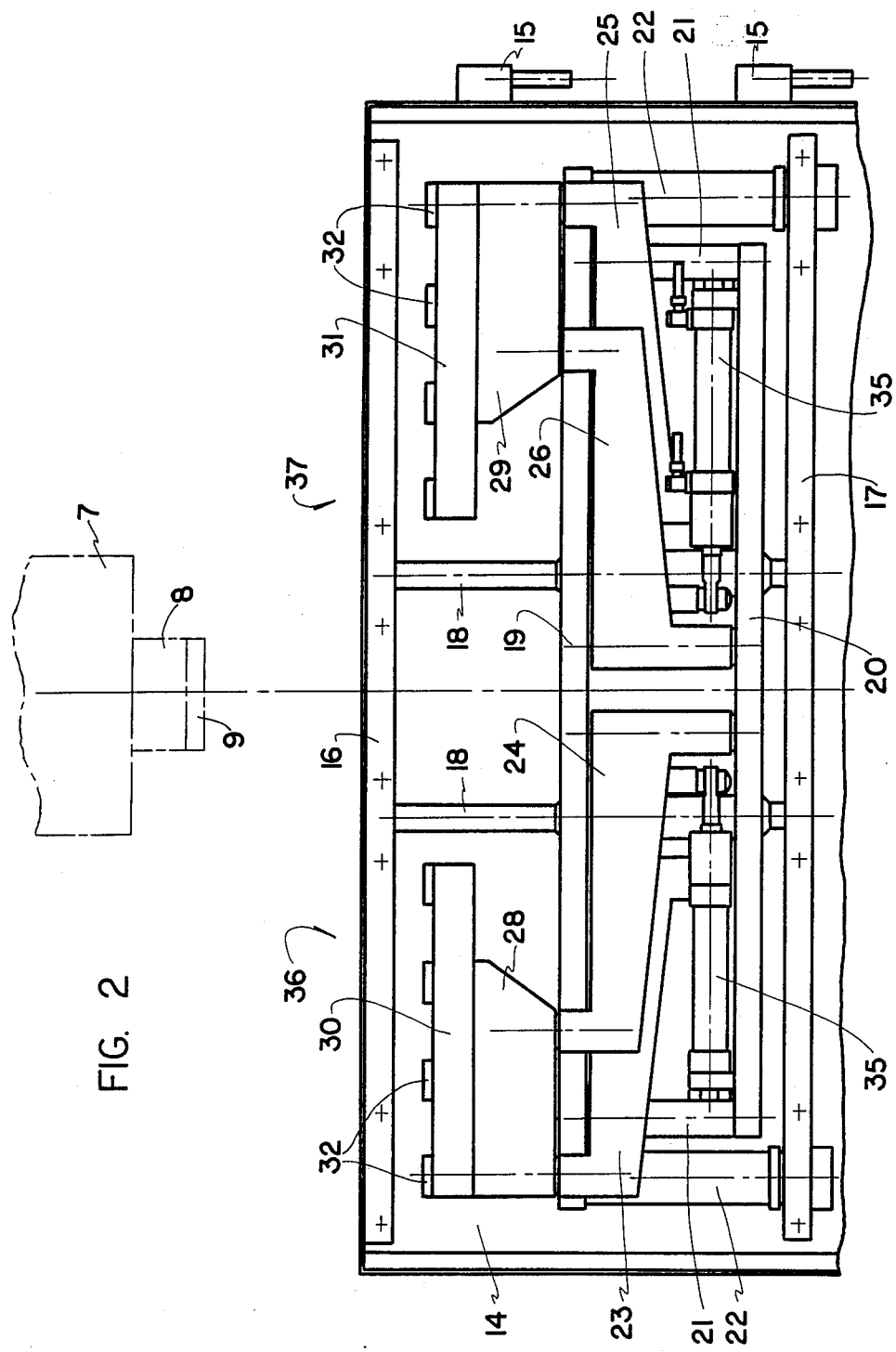
FIG. 2 shows a partial view of one side wall of the tub, seen from the interior, including the electrode change mechanism in rest position.

In FIG. 1, an spark erosion machining apparatus is generally designated with reference numeral 1, schematically shown in a front view. The spark erosion machining apparatus 1 comprises a base member 3 supporting a worktable 4 displaceable in X- and Y-direction. The worktable 4 supports a tub 5 which is open on its top side and serves to receive the dielectric liquid required for the electro-erosive machining process.

Further mounted on the base member 3 is a column 6 which supports the machining head 7. A spindle 8 is provided in the machining head 7 such that it can be displaced in Z-direction, i.e. with regard to its height position. If necessary, the spindle 8 can be mounted to be rotatable. The spindle 8 is equipped with a chuck 9 adapted to receive a machining tool 10 which is but schematically shown in the drawings. In the present example, the tool 10 is an electrode required for the electro-erosive machining operation. In the interior of the tub 5, there is provided a workpiece clamping means 11 adapted to receive a workpiece 12 to be machined.

The exact design and the operation of such a spark erosion machining apparatus is well known to any person skilled in the art and will not be explained here in detail.

According to the embodiment shown in FIGS. 2 to 5, the tub 5 is provided with a hinged, door-like front wall 14 pivotally mounted on the tub 5 e.g. by means of hinges 15. An upper transverse beam 16 and a lower transverse beam 17 is fixed to the inner surface of the front wall 14. Two guiding columns extend between the upper and the lower transverse beams 16 and 17, respectively. Furthermore, there is provided a frame consisting of an upper transverse beam 19, a lower transverse beam 20 and two interconnecting beams 21 connected to the upper and lower transverse beams 19 and 20, respectively, at their ends. The frame is fixed to the two guiding columns 18 and can be displaced along them to be displaceable with regard to its height position. In order to displace the frame, e.g. pneumatically operated drive cylinder-piston units 22 are provided on both sides of the frame; the cylinder-piston units 22 rest with their lower end on the lower transverse beam 17 and are connected with their upper end to protrusions of the upper transverse beam 19 projecting beyond the lateral interconnecting beams 21.

Two pairs of levers are pivotally connected to the above-mentioned frame consisting of the upper transverse beam 19, the lower transverse beam 20 and the two interconnecting beams 22: The first pair of levers includes an outer lever 23 and an inner lever 24, and the second pair includes an outer lever 25 and an inner lever 26. According to the view shown in FIG. 2, it can be seen that all levers 23 to 26 have essentially Z-shaped form whereby, in each case, a first outer leg of the lever 23 to 26 is rotatable around a shaft 27 extending between the upper transverse beam 19 and the lower transverse beam 20. The second outer legs of the first pair of levers 23 and 24, respectively, are provided with a support member 28 and the two other outer legs of the second pair of levers 25 and 26, respectively, are provided with a support member 29 whereby the linkage between the respective outer legs and the associated support members 28 and 29, respectively, is pivotal as well. Thus, a parallelogram-like linkage arrangement is formed by means of which the two support members 28 and 29, respectively, can be parallely displaced.

Figure 3:
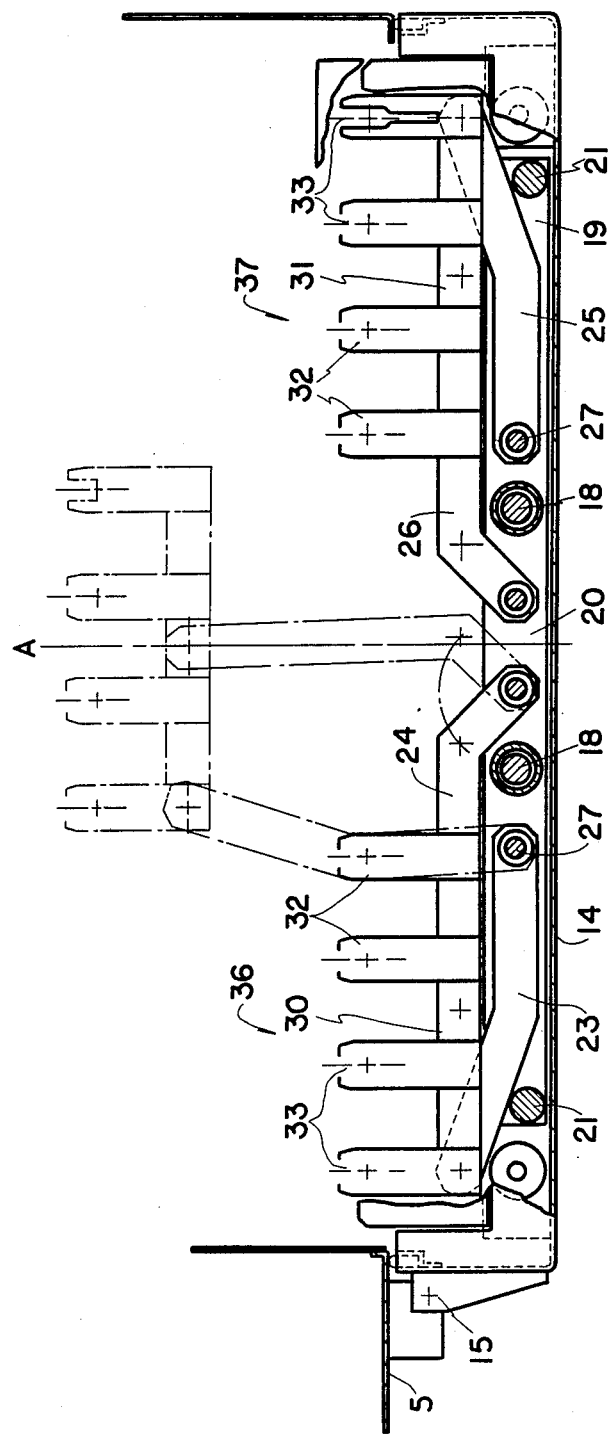
FIG. 3 shows a partial top view of the tub, whereby a portion of the electrode change mechanism is shown, in broken lines, in its operating position.
Figure 5:
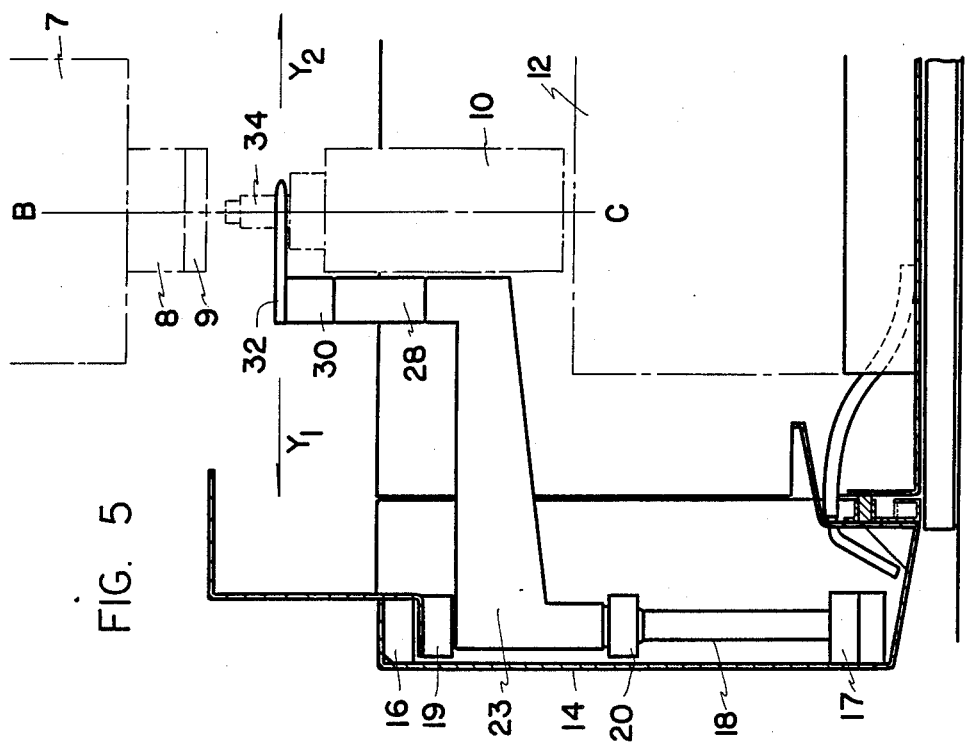
FIG. 5 a sectional view of one wall of the tub with the electrode change mechanism in its operating position.
Figure 4:
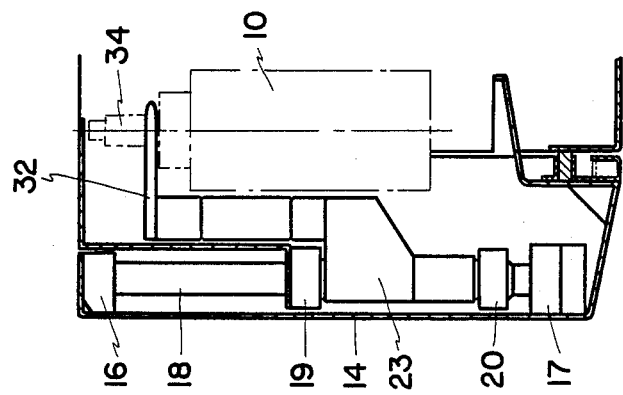
FIG. 4 a sectional view of one wall of the tub with the electrode change mechanism in its rest position.

The two support members 28 and 29 each are provided with a transverse beam 30 and 31, respectively, to each of which are connected, in the example shown in the drawings, four electrode support members 32. As can be seen in FIGS. 3-5, the electrode support members 32 have folk-shaped shape and protrude perpendicularly from the transverse beams 30 and 31 towards the interior of the tub 5. The free ends of the electrode support members 32 are provided with a slit-like aperture 33 adapted to receive the shaft 34 of an electrode 10 (FIGS. 4 and 5).

Thus, an electrode support means is constituted incorporating the upper and lower transverse beams 19 and 20, the interconnecting beams 21, the four pivotally mounted levers 23, 24, 25 and 26, the support members 28 and 29, the transverse beams 30 and 31 as well as the electrode support members 32. The electrode support means is displaceable with regard to its height position under the influence of the cylinder-piston units 22 and, on the other hand, is pivotal from a rest position into an operating position. The pivotal movement mentioned just hereinbefore is effected under the influence of e.g. pneumatically operated cylinder-piston drive units 35 connected to the interconnecting beams 21 at their one end and pivotally fixed to the levers 24 and 25, respectively at their other ends.

The elements described in detail hereinbefore form an electrode support means including two electrode supporting units which can be pivoted from their rest position into their operating position independently from each other. As can be seen on the left hand side of FIG. 2 and 3, the first unit 36 consists of a first portion of the frame, of the first pivoting lever pair comprising the levers 23 and 24, of the support member 28, of the transverse beam 30 and of four electrode support members 32. As can be seen on the right hand side of FIG. 2 and 3, the second unit 37 consists of a second portion of the frame, of the second pivoting lever pair comprising the levers 25 and 26, of the support member 29, of the transverse beam 31 and of four electrode support members 32. Both units 36 and 37 are mounted on the front wall 14 of the tub 5 symmetrically with regard to a central axis A. The arrangement is such that each unit 36 and 37, respectively, can take two different positions:

A rest position according to FIG. 4 and shown in FIG. 3 in solid lines in which the pivotally mounted levers 23, 24 and 25, 26, respectively, are pivoted towards the frame consisting of the beams 19, 20 and 21 such that the transverse beams 30 and 31, respectively, and therewith the electrode support members 32 are located as near to the front wall 14 of the tub 5 as possible; each unit 36 and 37, respectively, claims space only in the region of one half of the inner surface of the front wall 14, on both sides of the central axis A.

An operating position according to FIG. 5 and shown in FIG. 3 in broken lines in which the pivotally mounted levers 23, 24 and 25, 26, respectively, are pivoted towards the interior of the tub 5 such that the transverse beams 30 and 31, respectively, and therewith the electrode support members 32 are located in an essentially central position within the tub 5. As can be clearly seen in FIG. 3, two of the electrode support members 32 are at the left side of the central axis A and two of the electrode support members 32 are at the right side of the central axis A.

This behaviour can be achieved in a way such that the pivoting axes (central axes of the shafts 27) of the first and second lever pairs 23, 24 and 25, 26, respectively, are located near to the central axis A, that the levers 23 to 26, as seen in their base projection, are angularly shaped to such an extent that the two pivoting axes of the levers are offset to each other by an amount corresponding to the width of the upper transverse beams 16 and 19, respectively, and that the levers 23 and 25, respectively, are fixed to the outer ends of the transverse beams 30 and 31, respectively, which are remote from each other, while the levers 24 and 26, respectively, are fixed to the center of the transverse beams 30 and 31, respectively.

It is understood that only one of the two support units 36 or 37 is to be brought from the rest position into the operating position because the chuck 9 of the spindle 8 picks up only one single electrode 10 received in the electrode support members 32 during an electrode change operation.

The operation of the electrode changing mechanism is as follows:

It is supposed that all electrode support members 32 are equipped with an electrode 10 and that both supporting units 36 and 37 are in their retracted rest position as shown in FIG. 3 in solid lines. The same situation is also shown in the view according to FIG. 4. Now, the erosion process can be started and the spindle 8 must be provided with an electrode. It is further assumed that the electrode required just at the beginning of the erosion process is in the supporting unit 36. Therefore, the levers 23 and 24 are pivoted from their rest position into their operating position as shown in FIG. 3 in broken lines under the influence of the drive cylinder-piston unit 35. As soon as the operating position is reached, the four electrodes 10 received in the four electrode support members 32 of the first supporting unit 36 are positioned in an essentially central portion of the tub 5.

Now, the tub 5 is displaced by suitable drive means (not shown) known in the art in X- and/or Y-direction to such an extent that the central axis B of the chuck 9 of the spindle 8 is aligned with the central axis C of the selected electrode 10. Thereafter, the entire frame consisting of the beams 19, 20 and 21 can be upwardly displaced by means of the drive cylinderpiston unit 22 until the shaft 34 of the electrode 10 enters the chuck 9 to enable the electrode 10 to be fixed to the spindle 8. By displacing the tub 5 in a direction $X_1$ (FIG. 5), the shaft 34 of the electrode 10 is released from the electrode support member 32, the frame consisting of the beams 19, 20 and 21 can be lowered again and the levers 23 and 24 can be pivoted back into their rest position.

Now, the electro-erosive machining operation can start by means of the first electrode 10 which has been fixed to the spindle 8. The retracted supporting units 36 and 37 do not have a disadvantageous influence on the machining operation as the electrodes 10 stored in the electrode support members 32 are located very near to the front wall 14 (FIG. 4).

As soon as the first cycle of the electro-erosive machining operation performed by means of the first electrode is finished, the first supporting unit 36 is pivoted into its operating position again, raised and finally brought into such a position by displacing the tub 5 in X- and $Y_2$-direction that the associated electrode support member 32 grasps the shaft 34 of the electrode 10 fixed to the spindle 8. Thereafter, either the frame consisting of the beams 19, 20 and 21 is lowered or the spindle 8 is raised, then the tub 5 is displaced in X-direction until the central axis A of the electrode 10 required for the next operating cycle is aligned with the center axis B of the spindle 8 and the frame consisting of the beams 19, 20 and 21 is raised or the spindle 8 is lowered again in order to mount this next electrode 10. Finally, the tub 5 is displaced in $X_1$-direction as described just hereinbefore, the frame is lowered, if necessary, and the levers 23 and 24 are pivoted back into their rest position in order to give the interior of the tub 5 free for the next machining cycle.

This operational sequence is repeated in analoguous manner, using a plurality of electrodes, until the electro-erosive machining of the workpiece 12 is finished. It is understood that, for instance, all four electrodes 10 in the first supporting unit 26 having been used, the second supporting unit 37 is subsequently pivoted into its operating position in order to enable the electrodes 10 received in said second unit 37 to be inserted into the spindle 8, as required. Due to the design and the arrangement of the levers 23, 24 and 25, 26, respectively, the associated transverse beam 30 and 31, respectively, with the associated electrode supporting members 32 take exactly the same central position within the tub 5 in both cases, with the result that the required displacement movements are minimized and the control of the machining apparatus is simplified. It is further understood that the electrodes are put into the electrode supporting members 32 in a useful order in order to optimize the sequence of the displacement movements. For instance, the electrodes 10 required for the four subsequent machining steps are inserted into the first supporting unit 36 and the electrodes 32 required for the fifth to eighth machining cycles are in the second supporting unit 37.

As already mentioned the insertion of an electrode 10 into the chuck of the spindle 8, of course after positioning the X- and Y-direction, can be performed either by raising the frame consisting of the beams 19, 20 and 21 or by lowering the spindle 8 or by performing both movements simultaneously.

If workpieces have to be machined which have a considerable height, e.g. as shown in FIG. 5 in broken lines and indicated with reference numeral 12', it is necessary, in a first step, to raise the frame consisting of the beams 19, 20 and 21 before the levers 23, 24 and 25, 26, respectively, can be pivoted into their operating position. In this case the inserting of the electrode 10 into the chuck 9 of the spindle 8 is exclusively performed by lowering the spindle 8 as soon as the X-Y-positioning has been terminated.

It is understood that the apparatus hereinbefore described can be modified in several aspects within the scope of the present invention. For instance the transverse beams 30 and 31, respectively, can be releasably and exchangeably fixed to the support members 28 and 29, respectively, in order to enable the electrode change mechanism to receive either a group of four electrode supporting members with a considerable distance between each other as required for comparatively large electrodes 10 (as shown in the drawings) or a group of e.g. five or six electrode supporting members 32 as required for smaller electrodes 10 which are located near to each other. Furthermore, the design and the arrangement of the frame consisting of the beams 19, 20 and 21 and the design of the levers 23 and 26 can be modified as long as the pivoting movement of the electrode support members from a rest position near to a wall of the tub into an operating position located in an essentially central portion within the tub can be realized.

The apparatus according to the invention provides an electrode handling and change mechanism which is of very simple design, which is sturdy and uncomplicated and which can be cheaply manufactured. It is sufficient for many purposes which do not require a great number of electrodes to be ready for immediate access, but in which only a few electrodes have to be changed. As most of the spark erosion machining apparatus currently available are provided with a tub with a front wall which can be opened like a door, the embodiment hereinbefore described is very suitable for the modification of an existing spark erosion machining apparatus because the entire electrode changing mechanism is fixed to the door-like front wall of the tub and because the front wall can easily be modified or exchanged. Finally, it should be mentioned that the required motion sequences within the electrode changing mechanism are very simple (pivoting of the levers and linear height displacement of the frame); thus, a fully automated electrode exchange process using the above described design can be easily integrated into an existing control program of the spark erosion machining apparatus.

What I claim is:
1. A spark erosion machining apparatus comprising:
   a spindle adapted to receive and clamp an electrode used for machining a workpiece into a desired shape;
   a displaceably mounted working table located in a certain distance below said spindle;
   first drive means operatively coupled to said working table to displace it with regard to said spindle within a horizontal plane in X-direction;
   second drive means operatively coupled to said working table to displace it with regard to said spindle within a horizontal plane in Y-direction;
   a tub mounted on said working table adapted to receive the dielectric liquid required for the erosion machining and to receive the workpiece to be machined;
   at least one electrode storage means having a plurality of electrode support members and located in the interior of said tub;
   said at least one electrode storage means comprising linkage means pivotally connected said electrode support members to at least one side wall of said tub;
   said electrode support members being pivotal from a retracted rest position near said side wall of said tub into an operating position in which they protrude from said side wall of said tub towards the interior of said tub into an operating region;

said first and second drive means being adapted to displace said tub in X- and/or Y-direction such that said spindle of the apparatus is above a selected electrode received in said electrode support members when said electrode support members are pivoted into their operating position.

2. A spark erosion machining apparatus according to claim 1, in which said at least one electrode storage means is mounted to be displaceable in Z-direction.

3. A spark erosion machining apparatus according to claim 2, further comprising hydraulic or pneumatic cylinderpiston means operatively coupled to said at least one electrode storage means to displace it in the height direction.

4. A spark erosion machining apparatus according to claim 2, in which said at least one electrode storage means comprises a frame including a frame part mounted on one of the side walls of said tub, said frame part being displaceable in height (Z-) direction, and further including at least two levers pivotally mounted on said frame part, said electrode support members being connected to the free ends of said levers.

5. A spark erosion machining apparatus according to claim 4, further comprising hydraulic or pneumatic cylinderpiston means operatively coupled to said levers to drive them to a pivotal motion.

6. A spark erosion machining apparatus according to claim 4, in which the free ends of said at least two levers are provided with a pivotally mounted transverse beam, said transverse beam being equipped with a plurality of essentially fork-shaped electrode support members protruding from said transverse beam towards the interior of said tub.

7. A spark erosion machining apparatus according to claim 6, in which said transverse beam equipped with the electrode support members is releasably mounted on said at least two levers.

8. A spark erosion machining apparatus according to claim 2, in which said at least one electrode storage means comprises a frame including a frame part mounted on one of the side walls of said tub, said frame part being displaceable in height (Z-) direction, and further including two pairs of levers pivotally mounted on said frame part, two groups of said electrode support members being connected to the free ends of each pair of said levers and said two groups of electrode support members being symmetrically arranged with regard to a central axis of said one side wall of said tub.

9. A spark erosion machining apparatus according to claim 8, further comprising hydraulic or pneumatic cylinderpiston means operatively coupled to said levers to drive them to a pivotal motion.

10. A spark erosion machining apparatus according to claim 8, in which said levers are pivotally mounted on said frame and on said electrode support members such that each of said electrode support member group can be swivelled into an essentially central position within said tub.

11. A spark erosion machining apparatus according to claim 9, in which said levers are of angled shape.

12. A spark erosion machining apparatus according to claim 1, in which said tub comprises a hinged, door-like front wall on which said at least one electrode storage means is mounted.

* * * * *